May 17, 1955 F. T. ROACH 2,708,719

HIGH FREQUENCY GENERATOR

Filed Feb. 17, 1949

2 Sheets-Sheet 1

INVENTOR.
Frank T. Roach,
BY
Robert R. Lockwood
Atty.

May 17, 1955 F. T. ROACH 2,708,719

HIGH FREQUENCY GENERATOR

Filed Feb. 17, 1949 2 Sheets-Sheet 2

INVENTOR.
Frank T. Roach,
BY Robert R. Lockwood
atty.

United States Patent Office 2,708,719

Patented May 17, 1955

2,708,719

HIGH FREQUENCY GENERATOR

Frank T. Roach, Hayward, Calif., assignor, by mesne assignments, to National Cylinder Gas Company, a corporation of Delaware Application February 17, 1949, Serial No. 77,028

4 Claims. (Cl. 250—36)

This invention relates, generally, to high frequency generators of the thermionic or electric valve type and associated circuits, and it has particular relation to such means for superimposing high frequency energy on an arc, such as a welding arc, to stabilize the operation thereof. The present invention can be employed for stabilizing alternating current or direct current arcs used in manual or automatic arc welding. Further, this invention constitutes an improvement over that disclosed in application, Serial No. 67,794, filed December 29, 1948, Patent No. 2,532,807, granted December 5, 1950, in the names of Dean C. Girard and Frank T. Roach, and assigned to the assignee of this application.

As disclosed in this copending application, a self-rectifying, self-excited, high frequency generator is employed to stabilize a welding arc. The power current for maintaining the welding arc flows through an inductor, which may be located in the electrode handle, adjacent the arc. The high frequency energy from the high frequency generator is applied to the inductor by a co-axial cable. In order to avoid interference with other apparatus, it is essential that the generator operate substantially at a given frequency which is different from the frequency at which such other apparatus operates. At the present time a frequency of 27.1 mc. has been selected as being suitable for this purpose.

Among the objects of the present invention are: To stabilize an arc, such as a welding arc, by superimposing thereon substantially only a single radio frequency to avoid interference with apparatus operating on other frequencies; to provide a high frequency oscillator having a high degree of stability for generating high frequency to be applied to an arc, either alternating or direct current for either manual or automatic arc welding, to stabilize the arc or for other purposes; to construct such an oscillator so that it can be maintained and adjusted by unskilled personnel and still have optimum adjustment for a critical frequency while at the same time being simple and dependable; to provide a one stage power oscillator of a new and improved character; to employ a thermionic tube or valve in a power oscillator in which the capacitance of the valve is in series, not in parallel, relation with the tuning capacitor; to employ a capacitor in the grid circuit which is capable of withstanding the heat generated by a high current node; to construct a co-axial tuning capacitor in such manner that it is capable of withstanding relatively high heat generated by a high current node therein; to construct said capacitor by employing a co-axial conductor having a relatively low propagation factor; to transfer the high frequency energy from the high frequency generator to the inductor adjacent the arc by a co-axial cable and to tune the circuit including the inductor to be resonant at the desired frequency; to employ a co-axial conductor for tuning the inductor and to connect the same in series or in parallel therewith; and to transfer the high frequency energy from the high frequency generator to the co-axial cable inductively and to transfer it in like manner to the inductor.

The foregoing objects are attained by using a single stage, self-rectifying, self-excited grid controlled thermionic generator. The grid circuit is tuned by a co-axial conductor whose length is adjusted in accordance with the desired frequency. This conductor comprises a rigid metallic tubular outer electrode and an inner electrode spaced therefrom by beads of heat resistant insulating material nested together. The generator includes a tank circuit connected to the plate comprising an inductor and a variable capacitor. Energy is transferred from the tank circuit by a co-axial cable to the inductor adjacent the arc. Tuning for this inductor to cause optimum operation of the circuit at the desired frequency is provided by a co-axial conductor connected either in parallel or series and cut to a length to suit. The co-axial cable is connected to the tank circuit and to the inductor adjacent the arc conductively, capacitively, or inductively.

Other objects of this invention will, in part, be obvious and in part appear hereinafter.

This invention is disclosed in the embodiments thereof shown in the accompanying drawings and it comprises the features of construction, combination of elements, circuit connections, and arrangement of parts shown in the accompanying drawings and described in detail hereinafter. The scope of the present invention is set forth in the appended claims.

For a more complete understanding of the nature and scope of this invention reference can be had to the following detailed description, taken together with the accompanying drawings, in which.

Figures 1, 2:
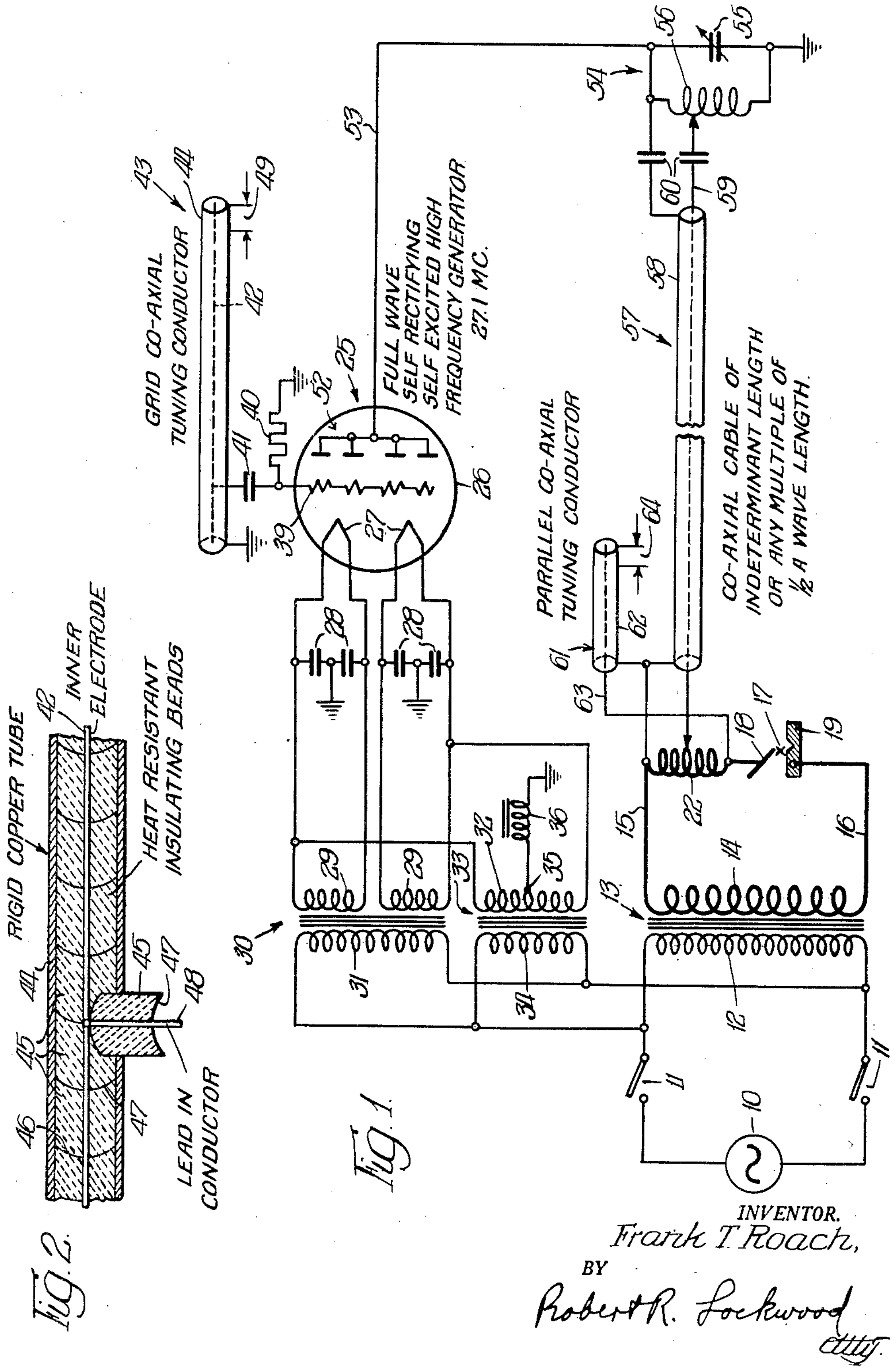
Figure 1 is a view which illustrates diagrammatically the apparatus and circuit connections which can be employed in practicing this invention.
Figure 2 is a longitudinal sectional view of a portion of the co-axial tuning conductor that is employed in conjunction with grid of the thermionic generator.

Referring now particularly to Figure 1 of the drawings, it will be observed that the reference character 10 designates a source of alternating current, such as a 220 volt 60 cycle source. The source 10 may be connected by switches 11 to energize a primary winding 12 of a welding transformer that is indicated, generally, at 13. The welding transformer 13 has a high current secondary winding 14 which is connected to energize a welding circuit that comprises conductors 15 and 16. An arc 17 is maintained by the power current which is applied over the welding circuit from the secondary winding 14, the arc being maintained between a welding electrode 18 and a work piece 19 on which the welding operation is to be performed. It will be understood that the welding electrode 18 may be of the non-consumable type and that provision may be made for maintaining a gaseous atmosphere around the arc 17 as disclosed in the copending application referred to above. Also, it will be understood that the welding electrode 18 may be of the consumable type and that provision can be made for feeding it either manually or automatically as may be desired. While the welding arc 17 is illustrated as being maintained from an alternating current source, it will be understood that the present invention, if desired, can be employed for stabilizing the operation of a welding arc which is supplied from a direct current source.

With a view to stabilizing the operation of the arc 17 an inductor 22 is connected in the welding circuit adjacent to the arc 17. Provision is made, as will be set forth hereinafter, for supplying high frequency energy to the inductor 22 so that the same can be superimposed on the arc 17 to stabilize its operation. The inductor 22 may comprise nine turns of hollow copper tubing having an air core or a core of non-magnetic material and it may be located in the handle which supports the welding electrode 18 as disclosed in the copending application above referred to. As there set forth, provision can be made for circulating a coolant, such as water, through the copper tubing to cool it and the parts immediately adjacent the welding electrode 18 so as to remove the heat therefrom that is generated by the welding arc 17. The present invention has to do particularly with the construction of the means for generating the high frequency and for transferring it to the inductor 22.

The preferred form of high frequency generator is illustrated, generally, at 25 in Figure 1. It includes a thermionic tube or electric valve 26 having a single envelope. However, it will be understood that two three-element tubes or valves can be employed in lieu of the single tube or valve 26 illustrated. The generator 25, as indicated, is of the full wave self-rectifying, self-excited type and provision is made for causing it to operate at a frequency of 27.1 mc. which frequency is in the center of the band of frequencies which have been assigned for this purpose.

The tube or valve 26 includes a pair of cathodes 27 which may be connected through capacitors 28 to ground, in accordance with conventional practice, in order to provide a path for the flow of the radio frequency current supplied by the generator 25. The cathodes 27 may be heated from secondary windings 29 of a filament transformer that is shown, generally, at 30. The transformer 30 has a primary winding 31 which may be connected for energization to the source 10 when the switches 11 are closed.

The required anode-cathode potential may be provided by a secondary winding 32 of a transformer that is shown, generally, at 33. This transformer has a primary winding 34 which may be connected, as shown, for energization to the source 10 when the switches 11 are closed. The secondary winding 32 has a center tap 35 that is connected through an audio frequency choke 36 to ground. The cathodes 27 are maintained at a relatively high potential with respect to the anode, to be referred to in more detail hereinafter, since the operator is more closely associated with the circuit to the anode than he is with the circuit to the cathode 27.

The tube or valve 26 is provided with a grid 39 which may be formed in four sections and which may be connected through a grid resistor 40 to ground. With a view to controlling the frequency at which the generator 25 operates, the grid 39 is connected through a capacitor 41 to the inner electrode 42 of a co-axial tuning conductor that is indicated, generally, at 43. This conductor includes an outer electrode 44 which is grounded, as illustrated.

The construction of the tuning conductor 43 is important. It is subject to heating due to high current nodes and, accordingly, it is preferably made of material capable of withstanding high temperature. For this purpose the outer electrode 44 is formed, as shown in the drawing, of a rigid copper tube and the inner electrode 42 is insulated therefrom by heat resistant insulating beads 45. It will be observed that these beads 45 are cylindrical in shape and that one end 46 is convex and the other end 47 is concave so that they can be threaded on the inner electrode 42 and nested together to fill completely the rigid copper tube which forms the outer electrode 44. As a result of this construction there is a considerable improvement in the propagation factor. Connection to the inner electrode 42 is made by a lead in conductor 48 which extends through an insulator which may be one of the beads 45. For this purpose a suitable opening is made in the wall of the copper tube which forms the outer electrode 44 and also in the beads, as shown, so that the lead in conductor 48 can be connected, as by welding, to the inner electrode 42. For the particular frequency which has been selected for the generator 25, the co-axial tuning conductor 43 is about six feet long. The lead in conductor 48 is connected to the inner electrode 42 about one foot from one end. The tuning conductor 43 initially is somewhat longer than the exact length. In order to adjust it to the proper frequency a section 49 is cut off to an extent which is determined by test until the exact length required is provided. The rigid copper tube constituting the outer electrode 44 with the beads 45 therein, as shown in Figure 2, is dried and hermetically sealed to prevent the entrance of moisture. It is shaped on a mandrel in the form of a coil in order to reduce the space required for mounting it on a suitable chassis with the generator 25.

The valve or tube 26 also includes an anode or plate that is shown, generally, at 52. It may comprise four sections, as shown, corresponding to the four sections of the grid 39. The anode or plate 52 is connected by a conductor 53 to a tank circuit, shown generally at 54, which is connected to ground. It will be understood that the conductor 53 physically is relatively short and that the tank circuit 54 comprises a part of the generator 25. The tank circuit 54 includes a variable capacitor 55 that is connected in parallel with an inductor 56.

High frequency energy which appears in the indicator 56 is transferred by means of a co-axial cable, shown generally at 57, to the inductor 22. The co-axial cable 57 includes an outer electrode 58 and an inner electrode 59. It may be of indeterminate length or it may be any multiple of a half wave length of the frequency at which the generator 25 operates. Capacitors 60 are provided for connecting the co-axial cable 57 at one end to the inductor 56. This connection is made across about one and three-quarters turns of the inductor 56 so that a current feed is provided. At the other end the co-axial cable is connected across a like number of turns of the inductor 22.

It is desirable that the circuit including the inductor 22 be tuned to operate at the frequency supplied by the generator 25. This is accomplished preferably by a co-axial tuning conductor which is shown, generally, at 61. It includes an outer electrode 62 and an inner electrode 63. In Figure 1 of the drawings the co-axial tuning conductor 61 is illustrated as being connected in parallel with the inductor 22. As will appear hereinafter, it may be connected in series with the inductor 22 and the co-axial cable 57. The length of the tuning conductor 61 initially is such that a portion 64 must be cut off from one end for the purpose of calibrating it. Once the length of the co-axial tuning conductor 61 has been determined for a particular inductor 22, no further adjustment is required. It will be understood that the co-axial tuning conductor 61 can be located in the handle which contains the inductor 22 or an extension thereof as may be desired.

It will be understood that suitable means, such as illustrated in the copending application referred to above, can be employed for initiating the high frequency generator 25 in operation when it is desired to strike and maintain the arc 17 and for causing it to cease radiation automatically on termination of the welding operation. Also, automatic means can be provided for connecting the primary winding 12 of the welding transformer 13 to the source 10 and disconnecting it therefrom. Since such controls form no part of the present invention, they are not shown nor described further herein.

Once the length of the co-axial tuning conductor 43 for the grid 39 has been adjusted for the desired frequency and the length of the co-axial tuning conductor 61 likewise has been adjusted for this frequency, the only adjustment that need be made, if any, is provided by the variable capacitor 55. Thus, there are no complicated tuning adjustments which are required and the ordinary welder is capable of adjusting the capacitor 55 as may be required to secure optimum operations. Even when the tube or valve 26 is replaced, the only adjustment which may be required is that of the capacitor 55. This is due to the fact that the capacitance of the tube 26 is in series with that of the tank circuit 54.

While the length of the co-axial cable 57 may be indeterminate, it is preferable that it be a multiple of a half a wave length. This results in zero voltage at the inductor 22 with a current node at this point. Although the tuning conductor 61 can be connected, as indicated, in series, the parallel connection shown in Figure 1 is preferable.

Figure 3:
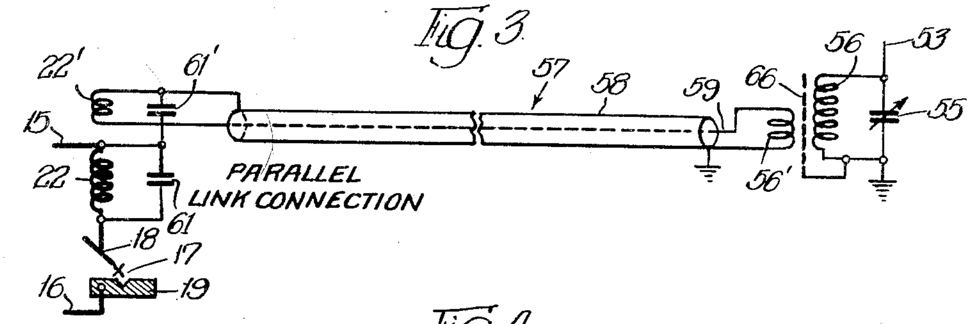
Figures 3, 4, 5 and 6 illustrate diagrammatically different connections that may be used for transferring the high frequency energy from the tank circuit of the high frequency generator to the inductor adjacent the arc.
Figure 4:
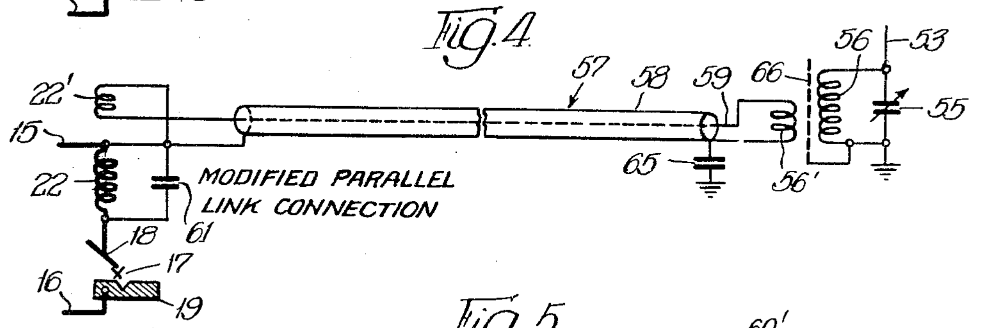

As illustrated in Figures 3 and 4 of the drawings, the co-axial cable 57 can be coupled inductively to the inductors 22 and 56. For this purpose the outer electrode 58 may be grounded either directly or through a capacitor 65 in Figure 4. Inductors 22′ and 56′ are related inductively with the inductors 22 and 56 respectively. In these figures a conventional symbol is employed to indicate the capacitor 61 which preferably is constructed as a co-axial tuning conductor as illustrated in Figure 1. An additional like capacitor 61′ may be provided, as shown in Figure 3, between the outer electrode 58 of the co-axial cable 57 and the capacitor 61.

With a view to eliminating harmonic radiation from the generator 25, an electrostatic shield 66 may be interposed between the inductors 56 and 56′, as shown in Figures 3 and 4. The shield 66 preferably is connected to the ground of the inductor 56.

Figure 5:
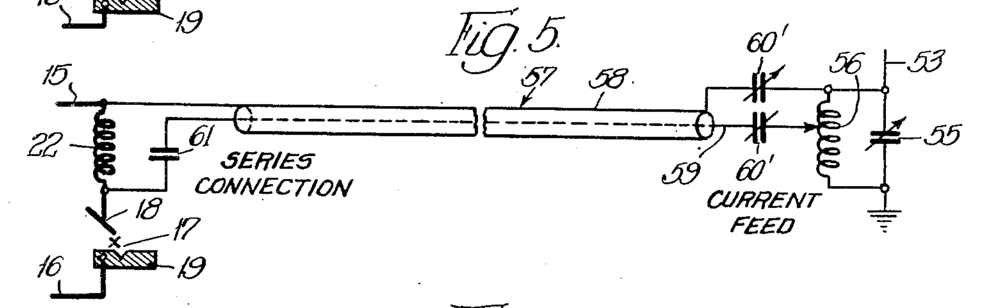

In Figure 5 of the drawings, the capacitor or co-axial tuning conductor 61 is shown as being connected in series between the co-axial cable 57 and the inductor 22. The other end of the co-axial cable 57 may be connected through adjustable capacitors 60′ to the inductor 56 to provide a current feed.

Figure 6:
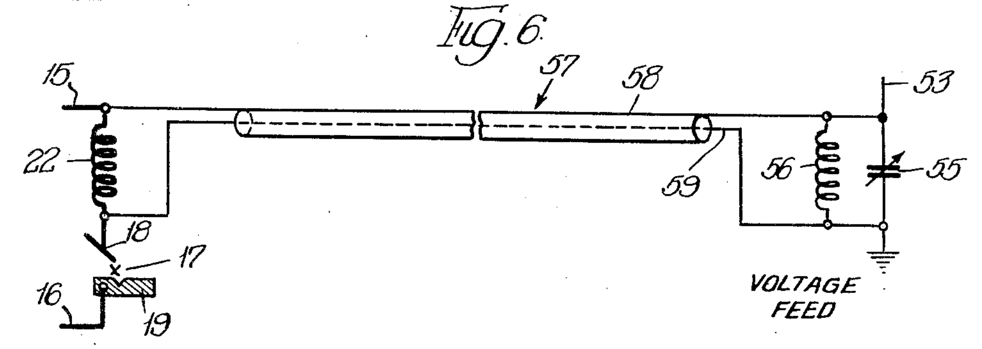

In Figure 6 the co-axial cable 57 is connected across the inductor 56 so that a voltage feed is provided. In this diagram the co-axial cable 57 is connected in the shunt with the inductor 22.

Since certain further changes can be made in the foregoing systems and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. In a high frequency power oscillator, in combination; full wave, single stage thermionic means having cathode, grid and anode means therein; circuit means connecting said cathode means to ground and for energization to a high voltage source to provide the required cathode-anode voltage, a first co-axial tuning conductor with its outer electrode connected to ground and its inner electrode connected to said grid means, a tank circuit including an inductor and a capacitor connected between said anode means and ground, reactive means constituting a load device, a co-axial cable between said load device and said tank circuit to transfer high frequency energy therebetween, and a second co-axial tuning conductor connected at the load end of said co-axial cable.

2. In a high frequency power oscillator, in combination; full wave, single stage thermionic means having cathode, grid and anode means therein; circuit means connecting said cathode means to ground and for energization to a high voltage source to provide the required cathode-anode voltage, a first co-axial tuning conductor having an outer tubular rigid electrode connected to ground and an inner electrode connected through the wall of said outer electrode near one end thereof to said grid means, a tank circuit including an inductor and a capacitor directly connected between said anode means and ground, reactive means constituting a load device, a co-axial cable between said load device and said tank circuit to transfer high frequency energy therebetween, and a second co-axial tuning conductor connected at the load end of said co-axial cable.

3. In a high frequency power oscillator, in combination; full wave, single stage thermionic means having cathode, grid and anode means therein; circuit means connecting said cathode means to ground and for energization to a high voltage source to provide the required cathode-anode voltage, a first co-axial tuning conductor with its outer electrode connected to ground and its inner electrode connected to said grid means, a tank circuit including an inductor and a capacitor directly connected between said anode means and ground, reactive means constituting a load device, a tuned co-axial cable between said load device and said tank circuit to transfer high frequency energy, and a second co-axial tuning conductor connected at the load end of said co-axial cable connected in parallel therewith.

4. In a high frequency power oscillator, in combination; full wave, single stage thermionic means having cathode, grid and anode means therein; circuit means connecting said cathode means to ground and for energization to a high voltage source to provide the required cathode-anode voltage, a first co-axial tuning conductor with its outer electrode connected to ground and its inner electrode connected to said grid means, a tank circuit including an inductor and a capacitor connected between said anode means and ground, reactive means constituting a load device, a tuned co-axial cable inductively coupled at each end respectively with said load device and said inductor to transfer high frequency energy, a second co-axial tuning conductor connected at the load end of said co-axial cable in parallel therewith, and a grounded electrostatic shield interposed between said inductor and the means inductively coupling the same to said cable for reducing harmonic radiation.

References Cited in the file of this patent

UNITED STATES PATENTS

| | | |
|---|---|---|
| 1,645,215 | Bauer | Oct. 11, 1927 |
| 2,077,800 | Kroger | Apr. 20, 1937 |
| 2,138,161 | Hansell | Nov. 29, 1938 |
| 2,177,272 | Zottu | Oct. 24, 1939 |
| 2,252,941 | Mittelman | Aug. 19, 1941 |
| 2,269,991 | Scheldorf | Jan. 13, 1942 |
| 2,325,965 | McArthur | Aug. 3, 1943 |
| 2,373,233 | Dow et al. | Apr. 10, 1945 |
| 2,387,783 | Twaney | Oct. 30, 1945 |
| 2,410,656 | Herold | Nov. 5, 1946 |
| 2,423,515 | Morris | July 8, 1947 |
| 2,435,788 | Lawson | Feb. 10, 1948 |
| 2,451,910 | Bock | Oct. 19, 1948 |
| 2,455,224 | Buchwalter | Nov. 30, 1948 |
| 2,467,736 | George | Apr. 19, 1949 |
| 2,475,357 | Miller | July 5, 1949 |
| 2,504,754 | Sweeney | Apr. 18, 1950 |
| 2,532,807 | Girard | Dec. 5, 1950 |
| 2,540,613 | Foley et al. | Feb. 6, 1591 |
| 2,548,881 | Ferrill | Apr. 17, 1951 |
| 2,583,128 | Stevenson | Jan. 22, 1952 |